United States Patent
Kim et al.

(10) Patent No.: US 12,504,921 B2
(45) Date of Patent: Dec. 23, 2025

(54) NONVOLATILE MEMORY DEVICE AND OPERATION METHOD THEREOF, AND STORAGE DEVICE INCLUDING THE SAME

(71) Applicant: Samsung Electronics Co., Ltd., Suwon-si (KR)

(72) Inventors: Kwanhyo Kim, Suwon-si (KR); Taec-Jun Kim, Suwon-si (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 18/760,599

(22) Filed: Jul. 1, 2024

(65) Prior Publication Data

US 2025/0199716 A1   Jun. 19, 2025

(30) Foreign Application Priority Data

Dec. 19, 2023   (KR) .................. 10-2023-0185966

(51) Int. Cl.
  *G06F 3/06* (2006.01)

(52) U.S. Cl.
  CPC .......... *G06F 3/0656* (2013.01); *G06F 3/0619* (2013.01); *G06F 3/0653* (2013.01); *G06F 3/0679* (2013.01)

(58) Field of Classification Search
  CPC ..... G06F 3/0656; G06F 3/0619; G06F 3/0679
  See application file for complete search history.

(56) References Cited

U.S. PATENT DOCUMENTS

| | | | |
|---|---|---|---|
| 10,466,903 B2 | 11/2019 | Benisty et al. | |
| 10,754,552 B2 | 8/2020 | Park | |
| 11,662,939 B2 | 5/2023 | Srinivasan et al. | |
| 2009/0198869 A1* | 8/2009 | Mosek ................ | G06F 12/0246 711/E12.008 |
| 2018/0275872 A1 | 9/2018 | Benisty et al. | |
| 2019/0065054 A1 | 2/2019 | Park | |
| 2020/0168283 A1* | 5/2020 | You ..................... | G11C 16/3418 |
| 2020/0341655 A1* | 10/2020 | Hashimoto ........... | G06F 3/0619 |
| 2022/0011959 A1 | 1/2022 | Srinivasan et al. | |
| 2022/0283720 A1* | 9/2022 | Kim ..................... | G06F 3/0659 |
| 2023/0070958 A1 | 3/2023 | You et al. | |
| 2023/0170002 A1 | 6/2023 | Lee et al. | |
| 2023/0244616 A1* | 8/2023 | Lee ..................... | G06F 13/1668 710/5 |
| 2023/0307054 A1* | 9/2023 | Manwani ........... | G11C 16/0483 |
| 2024/0061778 A1* | 2/2024 | He ....................... | G06F 12/0802 |
| 2024/0412793 A1* | 12/2024 | Lee ......................... | G11C 16/10 |

FOREIGN PATENT DOCUMENTS

| | | |
|---|---|---|
| KR | 10-0998212 B1 | 12/2010 |
| KR | 10-2444606 B1 | 9/2022 |
| KR | 10-2481649 B1 | 12/2022 |
| KR | 10-2023-0036682 A | 3/2023 |

* cited by examiner

*Primary Examiner* — Edward J Dudek, Jr.
(74) *Attorney, Agent, or Firm* — Fish & Richardson P.C.

(57) ABSTRACT

A nonvolatile memory device that includes a memory cell array including a plurality of nonvolatile memory cells; a page buffer circuit connected to the memory cell array; a status data memory circuit storing a first plurality of status data items; a control logic circuit controlling the status data memory circuit to accumulate the first plurality of status data items in the page buffer circuit, in response to a first status data group read command provided from an external device; and an input/output circuit outputting the first plurality of status data items accumulated in the page buffer circuit to the external device.

20 Claims, 14 Drawing Sheets

FIG. 11

TB_SDI

| Type of CMD_SDGR | STATUS DATA ITEM LIST |
|---|---|
| CMD_SDGRa | LIST1 {SDI1, SDI2, SDI3, ⋯, SDIn} |
| CMD_SDGRb | LIST2 {SDI1, SDI3, SDI5, ⋯} |
| CMD_SDGRc | LIST3 {SDI2, SDI4, SDI6, ⋯} |
| ⋮ | ⋮ |

NONVOLATILE MEMORY DEVICE AND OPERATION METHOD THEREOF, AND STORAGE DEVICE INCLUDING THE SAME

CROSS-REFERENCE TO RELATED APPLICATION

This application claims priority to and the benefit of Korean Patent Application No. 10-2023-0185966 filed at the Korean Intellectual Property Office on Dec. 19, 2023, the entire contents of which are incorporated herein by reference.

BACKGROUND

The present disclosure relates to semiconductor memory devices. More specifically, the present disclosure relates to nonvolatile memory devices and storage devices including the same.

A nonvolatile memory device may store status data and user data. The status data and the user data may be stored in different regions of the nonvolatile memory device. For example, the user data may be stored in a nonvolatile memory cell array within the nonvolatile memory device, and the status data may be stored in a volatile memory circuit within the nonvolatile memory device.

A storage controller may control the nonvolatile memory device through various commands. For example, the storage controller may issue different commands to perform a read operation on the user data and the status data. As a result, as compared with the read operation for the user data, the read operation for the status data may be performed with smaller capacity unit.

SUMMARY

Example embodiments of the inventive concepts provide a nonvolatile memory device that performs a read operation on a larger capacity of status data and an operation method thereof, and a storage device including the same.

Some example embodiments of the inventive concepts provide a nonvolatile memory device that includes a memory cell array including a plurality of nonvolatile memory cells; a page buffer circuit connected to the memory cell array; a status data memory circuit storing a first plurality of status data items; a control logic circuit controlling the status data memory circuit to accumulate the first plurality of status data items in the page buffer circuit, in response to a first status data group read command provided from an external device; and an input/output circuit outputting the first plurality of status data items accumulated in the page buffer circuit to the external device.

Some example embodiments of the inventive concepts further provide a storage device that includes a storage controller including a processing circuit that issues a status data group read request, and a nonvolatile memory interface circuit that issues a status data group read command in response to the status data group read request; and a nonvolatile memory device that continuously provides a plurality of status data items to the nonvolatile memory interface circuit in response to the status data group read command.

Some example embodiments of the inventive concepts still further provide an operation method of a nonvolatile memory device that includes a page buffer circuit connected to a volatile memory circuit and a nonvolatile memory cell array. The operation method includes receiving a status data group read command from an external device; accumulating a first plurality of status data items stored in the volatile memory circuit to the page buffer circuit based on the status data group read command; and outputting the first plurality of status data items accumulated in the page buffer circuit to the external device.

BRIEF DESCRIPTION OF THE DRAWINGS

FIG. 11 shows a command-status data item table of FIG. 10.

DETAILED DESCRIPTION

Figure 1:
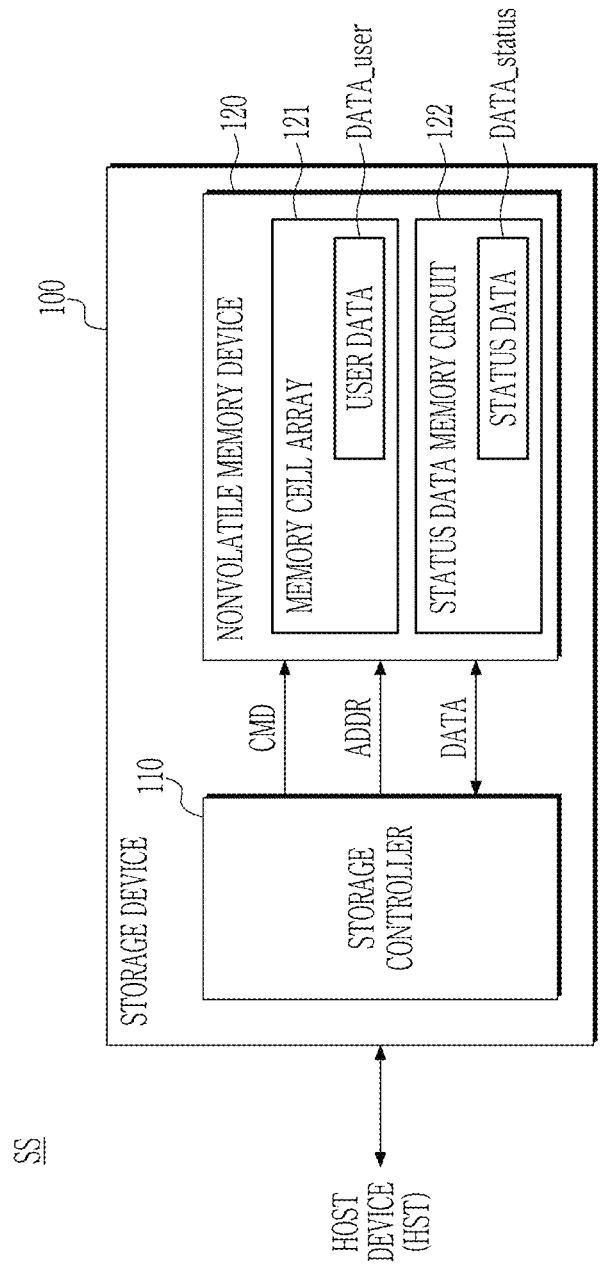
FIG. 1 is a block diagram of a storage system including a storage device according to some example embodiments of the inventive concepts.

Hereinafter, embodiments of the inventive concepts will be described clearly and in detail to such an extent that a person of an ordinary skill in the technical field of the present disclosure may easily perform the inventive concepts. Details such as detailed configurations and structures are provided simply to facilitate an overall understanding of the embodiments of the inventive concepts. Therefore, modifications of the embodiments described in the present disclosure may be performed by a person of an ordinary skill in the art without departing from the technical spirit and scope of the inventive concepts. Moreover, descriptions of well-known functions and structures are omitted for clarity and brevity. Configurations in the drawings or a detailed description of the inventive concepts may be connected to an element other than that shown in the drawings or described in the detailed description. Terms used in the present disclosure are defined considering functions of the inventive concepts, and are not limited to specific functions. The definition of the terms may be determined based on details described in the detailed description.

Elements described with reference to a term such as a driver, a block, or the like used in the detailed description may be implemented in the form of software, hardware, or a combination thereof. For example, the software may be a machine code, firmware, an embedded code, and application software. For example, the hardware may include an electrical circuit, an electronic circuit, a processor, a computer, integrated circuit cores, a pressure sensor, an inertial sensor, a microelectromechanical System (MEMS), a passive element, or a combination thereof.

Also, for example, "at least one of A, B, and C" and similar language (e.g., "at least one selected from the group consisting of A, B, and C") may be construed as A only, B only, C only, or any combination of two or more of A, B, and C, such as, for instance, ABC, AB, BC, and AC.

FIG. 1 is a block diagram showing a storage system according to some example embodiments of the inventive concepts. Referring to FIG. 1, the storage system SS may include a host device HST and a storage device 100.

The host device HST may access the storage device 100. For example, the host device HST may transmit various types of host commands to the storage device 100 to store user data DATA_user in the storage device 100 or to read the user data DATA_user stored in the storage device 100.

The storage device 100 may include a storage controller 110 and a nonvolatile memory device 120. The storage controller 110 may store data DATA in the nonvolatile memory device 120 or may read the data DATA stored in the nonvolatile memory device 120. For example, the storage controller 110 may transmit a command CMD and/or an address ADDR to the nonvolatile memory device 120 to store the data DATA in the nonvolatile memory device 120 or to read the data DATA stored in the nonvolatile memory device 120.

Hereinafter, it is assumed that the nonvolatile memory device 120 is a flash memory device and the storage device 100 is a solid state drive (SSD). However, the scope of the present disclosure is not limited thereto.

The nonvolatile memory device 120 may include a memory cell array 121. The memory cell array 121 may include a plurality of nonvolatile memory cells. The memory cell array 121 may store the user data DATA_user provided from the host device HST.

The nonvolatile memory device 120 may include a status data memory circuit 122. The status data memory circuit 122 may store status data DATA_status for the nonvolatile memory device 120. The status data DATA_status may include a plurality of status data items (hereinafter referred to as "SDI"). Each of the plurality of status data items SDI may represent a different type of status information for the nonvolatile memory device 120. A more detailed example of each of the plurality of status data items SDI will be described with reference to FIG. 4.

In some example embodiments, the status data memory circuit 122 may be implemented as a memory circuit independent of the memory cell array 121. For example, the status data memory circuit 122 may be implemented as a volatile memory circuit included within the nonvolatile memory device 120 and disposed outside the memory cell array 121. However, the scope of the inventive concepts is not limited thereto.

In some example embodiments, the status data DATA_status may include device status data indicating a device status of the nonvolatile memory device 120, and configuration status data indicating a configuration status of the nonvolatile memory device 120. The status data DATA_status will be described in more detail with reference to FIG. 4.

The storage controller 110 may perform a read operation for the user data DATA_user stored in the memory cell array 121 by providing a read command to the nonvolatile memory device 120. For example, the nonvolatile memory device 120 may output the user data DATA_user with a page unit in response to the read command.

The storage controller 110 may provide a status data item read command to the nonvolatile memory device 120 to perform a read operation for a single status data item SDI stored in the status data memory circuit 122. For example, the nonvolatile memory device 120 may output one of the plurality of status data items SDI included in the status data DATA_status in response to the status data item read command. An operation of the storage device 100 in which the read operation on one status data item SDI is performed will be described in more detail with reference to FIG. 5 below.

The storage controller 110 may provide the status data group read command to the nonvolatile memory device 120 to perform a read operation for the plurality of status data items SDI stored in the status data memory circuit 122. For example, the nonvolatile memory device 120 may continuously output the plurality of status data items SDI in response to the status data group read command. A method by which the nonvolatile memory device 120 performs a read operation on the plurality of status data items SDI will be described in more detail with reference to FIGS. 6 to 9.

In some example embodiments, the host device HST may read the status data DATA_status stored in the storage device 100 by transmitting a host command to the storage device 100. Some example embodiments in which the host device HST reads the status data DATA_status will be described in more detail with reference to FIG. 14.

Figure 2:
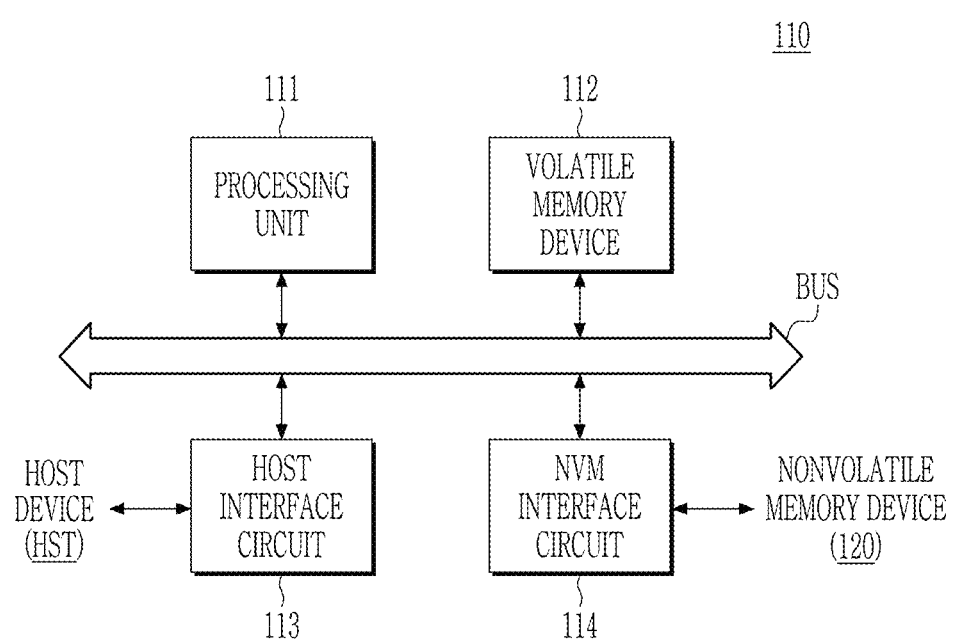
FIG. 2 is a block diagram showing a storage controller of FIG. 1.

FIG. 2 is a block diagram showing the storage controller of FIG. 1 in more detail. Referring to FIG. 1 and FIG. 2, the storage controller 110 may include a processing unit 111, a volatile memory device 112, a host interface circuit 113, and a nonvolatile memory interface circuit 114. The processing unit 111, the volatile memory device 112, the host interface circuit 113, and the nonvolatile memory interface circuit 114 may be connected to each other through a bus BUS.

The processing unit 111 may control an overall operation of the storage controller 110. For example, the processing unit 111 may execute various types of programs, applications, and firmware executed in the storage controller 110.

The volatile memory device 112 may be used as a buffer memory, an operation memory, or a cache memory of the storage controller 110. For example, the volatile memory device 112 may store various types of temporary data used in operations of the programs, the applications, and the firmware executed by the processing unit 111.

In some example embodiments, the volatile memory device 112 may be implemented based on static random access memory (SRAM) device, dynamic random access memory (DRAM) device, and/or a combination thereof. However, the scope of the inventive concepts is not limited thereto.

The storage controller 110 may communicate with the host device HST through the host interface circuit 113. For example, the host interface circuit 113 may communicate with the host device HST based on at least one of various types of host interfaces such as a Peripheral Component Interconnect express (PCI-express) interface, a nonvolatile memory express (NVMe) interface, a Serial ATA (SATA)

interface, a Serial Attached SCSI (SAS) interface, and a universal flash storage (UFS) interface.

The storage controller 110 may communicate with the nonvolatile memory device 120 through the nonvolatile memory interface circuit 114. For example, the nonvolatile memory interface circuit 114 may communicate with the nonvolatile memory device 120 based on a NAND interface.

The nonvolatile memory interface circuit 114 may issue command to the nonvolatile memory device 120 in response to a request from the processing unit 111. For example, if the processing unit 111 issues a status data item read request, the nonvolatile memory interface circuit 114 may issue the status data item read command to the nonvolatile memory device 120. Responsive to the status data item read command, the nonvolatile memory device 120 may transmit one status data item SDI to the nonvolatile memory interface circuit 114, and the nonvolatile memory interface circuit 114 may store the received status data item SDI in the volatile memory device 112.

Similarly, if the processing unit 111 issues a status data group read request, the nonvolatile memory interface circuit 114 may issue the status data group read command to the nonvolatile memory device 120. Responsive to the status data group read command, the nonvolatile memory device 120 may transmit the plurality of status data items SDI to the nonvolatile memory interface circuit 114, and the nonvolatile memory interface circuit 114 may store the received plurality of status data items SDI in the volatile memory device 112.

In some example embodiments, if the processing unit 111 reads the plurality of status data items SDI one by one from the nonvolatile memory device 120 by issuing a plurality of status data item read requests sequentially (e.g., one by one), the nonvolatile memory interface circuit 114 may have to receive the plurality of status data item read requests and may have to output a plurality of status data item read commands. For example, the processing unit 111, the nonvolatile memory interface circuit 114, and the nonvolatile memory device 120 may repeatedly perform the same operation, so that an operating speed of the storage device 100 is unnecessarily reduced.

On the other hand, if the processing unit 111 issues the status data group read request to continuously read the plurality of status data items SDI from the nonvolatile memory device 120, the number of times that the nonvolatile memory interface circuit 114 receives a request (e.g., the status data group read request), and the number of times that the nonvolatile memory interface circuit 114 outputs a command (e.g., status data group read command) may be reduced (and/or minimized). That is, according to some example embodiments of the inventive concepts, a time required to read the plurality of status data items SDI from the nonvolatile memory device 120 may be reduced (and/or minimized), so that the operating speed of the storage device 100 is improved.

Figure 3:
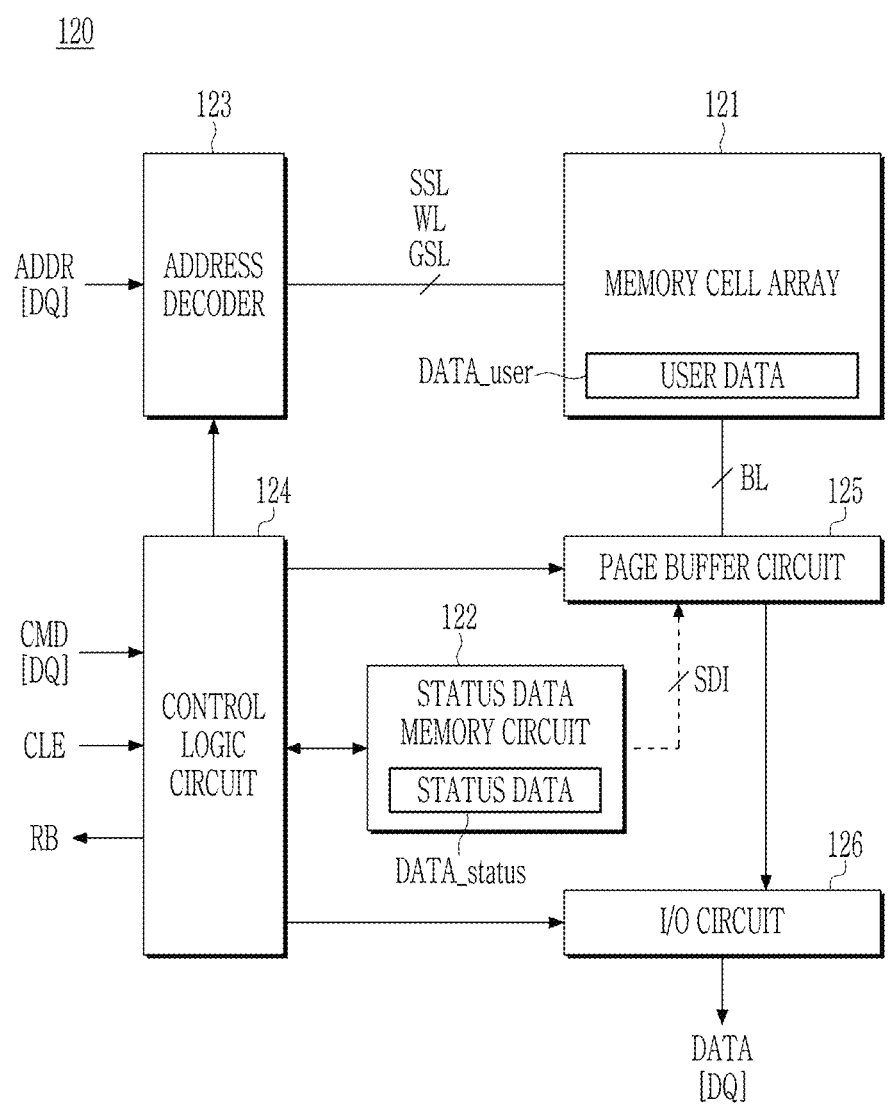
FIG. 3 is a block diagram showing a nonvolatile memory device of FIG. 1.

FIG. 3 is a block diagram showing the nonvolatile memory device of FIG. 1. Referring to FIGS. 1 to 3, the nonvolatile memory device 120 may include the memory cell array 121, the status data memory circuit 122, an address decoder 123, a control logic circuit 124, a page buffer circuit 125, and an input/output circuit 126.

Hereinafter, for a more concise description, FIG. 3 shows that various signals such as the command CMD, the address ADDR, and the data DATA are directly provided to various functional blocks (e.g., the address decoder 123, the control logic circuit 124, and the input/output circuit 126) through a plurality of data pins DQ. However, the scope of the present disclosure is not limited to a specific manner in which the command CMD, the address ADDR, and the data DATA are transmitted between the storage controller 110 and the nonvolatile memory device 120.

The memory cell array 121 may store the user data DATA_user. In some example embodiments, the user data DATA_user may be data provided from the host device HST. However, the scope of the present disclosure is not limited thereto, and the memory cell array 121 may store data stored in the volatile memory device 112 of the storage controller 110 in a sudden power off (SPO) situation.

The status data memory circuit 122 may store the status data DATA_status. In some example embodiments, the status data memory circuit 122 may be implemented as a static random access memory (SRAM) circuit. However, the scope of the present disclosure is not limited thereto, and the status data memory circuit 122 may be implemented as a dynamic random access memory (DRAM) circuit.

The address decoder 123 may be connected to the memory cell array 121 through string selection lines SSL, word lines WL, and ground selection lines GSL. The address decoder 123 may receive the address ADDR from the storage controller 110. The address decoder 123 may decode the address ADDR, and may control voltage levels of the string selection lines SSL, the word lines WL, and the ground selection lines GSL based on the decoded result.

The control logic circuit 124 may receive a command latch enable signal CLE from the storage controller 110. The control logic circuit 124 may receive the command CMD from the storage controller 110 based on a logic level of the command latch enable signal CLE. For example, the control logic circuit 124 may decode the command CMD provided through the plurality of data pins DQ in response to the command latch enable signal CLE being logic high.

The page buffer circuit 125 may be connected to the memory cell array 121 through a plurality of bit lines BL. The page buffer circuit 125 may temporarily store the user data DATA_user read from the memory cell array 121 through the plurality of bit lines BL or may temporarily store the user data DATA_user to be stored in the memory cell array 121. For example, if the read command is provided from the storage controller 110, the page buffer circuit 125 may store the user data DATA_user read from the memory cell array 121.

The page buffer circuit 125 may be connected to the status data memory circuit 122. The page buffer circuit 125 may receive the plurality of status data items SDI from the status data memory circuit 122. That is, the page buffer circuit 125 may accumulate the plurality of status data items SDI provided from the status data memory circuit 122. For example, if the status data group read command is provided from the storage controller 110, the control logic circuit 124 may control the status data memory circuit 122 to transmit the plurality of status data items SDI stored in the status data memory circuit 122 to the page buffer circuit 125.

Hereinafter, for a more concise description, some example embodiments in which the plurality of status data items SDI stored in the status data memory circuit 122 are directly transmitted to the page buffer circuit 125 will be representatively described. However, the scope of the present disclosure is not limited thereto, and the plurality of status data items SDI stored in the status data memory circuit 122 may be transmitted to the page buffer circuit 125 through the control logic circuit 124.

In some example embodiments, if a memory access command is provided from the storage controller 110, the page buffer circuit 125 may output the stored data to the storage controller 110 through the input/output circuit 126 under a control of the control logic circuit 124. For example, the page buffer circuit 125 may output the user data DATA_user or the plurality of status data items SDI to the storage controller 110 through the input/output circuit 126 in response to the memory access command. However, the scope of the present disclosure is not limited thereto.

The control logic circuit 124 may provide a ready/busy signal RB to the storage controller 110. The control logic circuit 124 may indicate an operating status (or an operating state) of the nonvolatile memory device 120 through the ready/busy signal RB. For example, while the nonvolatile memory device 120 operates in response to the command CMD provided from the storage controller 110, the control logic circuit 124 may provide the ready/busy signal RB indicating logic low to the storage controller 110. On the other hand, if the nonvolatile memory device 120 completes an operation in response to the command CMD provided from the storage controller 110, the control logic circuit 124 may provide the ready/busy signal RB indicating logic high to the storage controller 110. A logic level of the ready/busy signal RB according to an operating status (or an operating state) of the nonvolatile memory device 120 will be described in more detail with reference to FIG. 8.

The storage controller 110 may recognize the operating status of the nonvolatile memory device 120 based on the ready/busy signal RB. For example, while the ready/busy signal RB is logic low, the storage controller 110 may not provide the data DATA, the command CMD, and the address ADDR to the nonvolatile memory device 120 through the data pin DQ.

The input/output circuit 126 may output the data DATA stored in the page buffer circuit 125 to the storage controller 110. For example, the input/output circuit 126 may output the user data DATA_user stored in the page buffer circuit 125 to the storage controller 110, or may continuously output the plurality of status data items SDI stored in the page buffer circuit 125 to the storage controller 110.

For a more detailed example, the input/output circuit 126 may continuously output the plurality of status data items SDI stored in the page buffer circuit 125 to the storage controller 110 in response to a data strobe signal (DQS) (not shown) or a read enable signal (RE) (not shown) provided from the storage controller 110. For example, while the input/output circuit 126 continuously outputs the plurality of status data items SDI stored in the page buffer circuit 125 to the storage controller 110, the data strobe signal and the read enable signal may be continuously toggled. However, the scope of the present disclosure is not limited thereto.

In some example embodiments, if the data DATA (e.g., a portion of the user data DATA_user or a portion of the status data DATA_status) stored in the page buffer circuit 125 is output to the storage controller 110 through the input/output circuit 126, the data DATA having a capacity corresponding to a page size of the nonvolatile memory device 120 may be continuously output to the storage controller 110. For example, the input/output circuit 126 may output the data DATA per 4 KByte, 8 KByte, or 16 Kbyte to the storage controller 110. However, the scope of the present disclosure is not limited to a size of a unit capacity through which the input/output circuit 126 outputs the data DATA to the storage controller 110.

Figure 4:
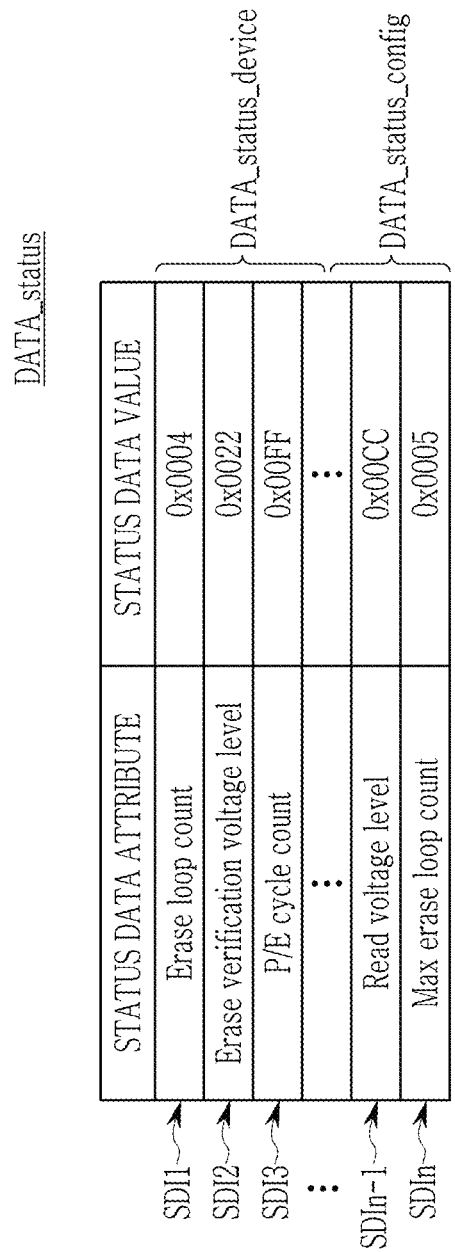
FIG. 4 is a view showing status data of FIG. 3.

FIG. 4 is a view showing the status data of FIG. 3. Referring to FIGS. 1 to 4, the status data DATA_status may include the plurality of status data items SDI. For example, the status data DATA_status may include first to n-th status data items SDI1-SDIn.

The status data DATA_status may include the device status data DATA_status_device and configuration status data DATA_status_config. For example, each of the first to n-th status data items SDI1-SDIn may be comprised in the device status data DATA_status_device or the configuration status data DATA_status_config.

Each of the status data items SDI included in the device status data DATA_status_device may represent a device status of the nonvolatile memory device 120. That is, each of the status data items SDI included in the device status data DATA_status_device may change depending on an operation of the nonvolatile memory device 120.

On the other hand, each of the status data items SDI included in the configuration status data DATA_status_config may represent a configuration status for the nonvolatile memory device 120 determined by the storage controller 110. That is, each of the status data items SDI included in the configuration status data DATA_status_config may be set in advance by the storage controller 110 to control the operation of the nonvolatile memory device 120.

The first to n-th status data items SDI1-SDIn may represent different status data attributes from each other. For example, each of the first to third status data items SDI1-SDI3 may represent a status data attribute different from each other for the device status data DATA_status_device, and each of the n−1th to n-th status data items SDIn−1-SDIn may represent a status data attribute different from each other for the configuration status data DATA_status_config.

For a more detailed example, the first status data item SDI1 may represent an erase loop count indicating the number of times that an erase operation for a memory block included in the memory cell array 121 consecutively fails; the second status data item SDI2 may represent an erase verification voltage level for the memory block included in the memory cell array 121; and the third status data item SDI3 may represent a program-erase (P/E) cycle count for an arbitrary memory block included in the memory cell array 121.

Similarly, the (n−1)-th status data item SDIn−1 may indicate a read voltage level for the memory cell array 121; and the n-th status data item SDIn may represent a maximum erase loop count indicating a upper limit number of times of erase operation for a memory block included in the memory cell array 121 to be continuously attempted. However, the scope of the present disclosure is not limited to the status data attribute represented by each of the first to n-th status data items SDI1-SDIn.

Each of the first to n-th status data items SDI1-SDIn may include a status data value for the status data attribute. For example, the first status data item SDI1 may include the status data value '0x0004' indicating the erase loop count; and the second status data item SDI2 may include the status data value '0x0022' indicating the erase verification voltage level. For a more concise description, a detailed description of the status data value included in each of the third to n-th status data items SDI3-SDIn is omitted.

In some example embodiments, the status data value for the device status data DATA_status_device may change depending on an operation of the nonvolatile memory device 120, and the status data value for the configuration status data DATA_status_config may be determined in advance by the storage controller 110 to control the operation of the nonvolatile memory device 120. However, the scope of the present disclosure is not limited thereto.

Figure 5:
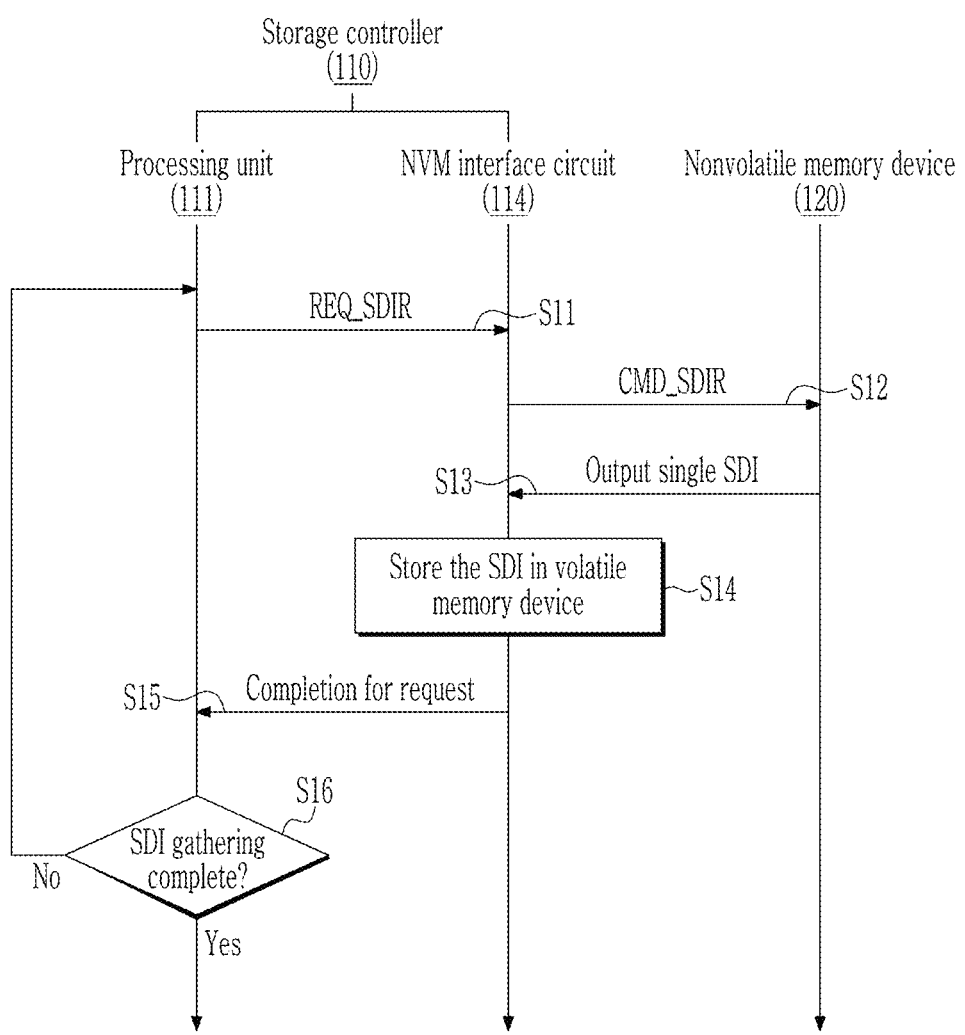
FIG. 5 is a flowchart showing an operation of a storage device according to some example embodiments.

FIG. 5 is a flowchart showing an operation of a storage device according to some example embodiments. Hereinafter, some example embodiments in which the storage controller 110 reads the plurality of status data items SDI one by one will be described with reference to FIGS. 1 to 5.

First, in operation S11, the processing unit 111 may transmit a status data item read request REQ_SDIR to the nonvolatile memory interface circuit 114. For example, in operation S12, the nonvolatile memory interface circuit 114 may transmit a status data item read command CMD_SDIR to the nonvolatile memory device 120.

In operation S13, the nonvolatile memory device 120 may output one status data item SDI to the nonvolatile memory interface circuit 114 in response to the status data item read command CMD_SDIR.

In operation S14, the nonvolatile memory interface circuit 114 may store the status data item SDI provided from the nonvolatile memory device 120 in the volatile memory device 112. For example, the processing unit 111 may access the status data item SDI stored in the volatile memory device 112 directly (e.g., without going through the nonvolatile memory interface circuit 114) through the bus BUS.

In operation S15, the nonvolatile memory interface circuit 114 may transmit completion for the status data item read request REQ_SDIR to the processing unit 111. For example, the processing unit 111 may recognize that the one status data item SDI has been stored in the volatile memory device 112 based on the completion for the status data item read request REQ_SDIR.

In operation S16, the processing unit 111 may determine whether gathering of the status data item SDI is completed. For example, the processing unit 111 may determine whether there is any status data item SDI to be additionally read from the nonvolatile memory device 120.

In operation S16, if it is determined that the gathering of the status data item SDI is not completed, the operations S11 to S15 described above may be repeatedly performed. In this way, the storage controller 110 may read the plurality of status data items SDI one by one. For example, the processing unit 111 may issue the status data item read request REQ_SDIR multiple times; the nonvolatile memory interface circuit 114 may issue the status data item read command CMD_SDIR multiple times; and the nonvolatile memory interface circuit 114 may output the plurality of status data items SDI to the storage controller 110 multiple times; resulting in inefficient operation of the storage device 100.

Figure 6:
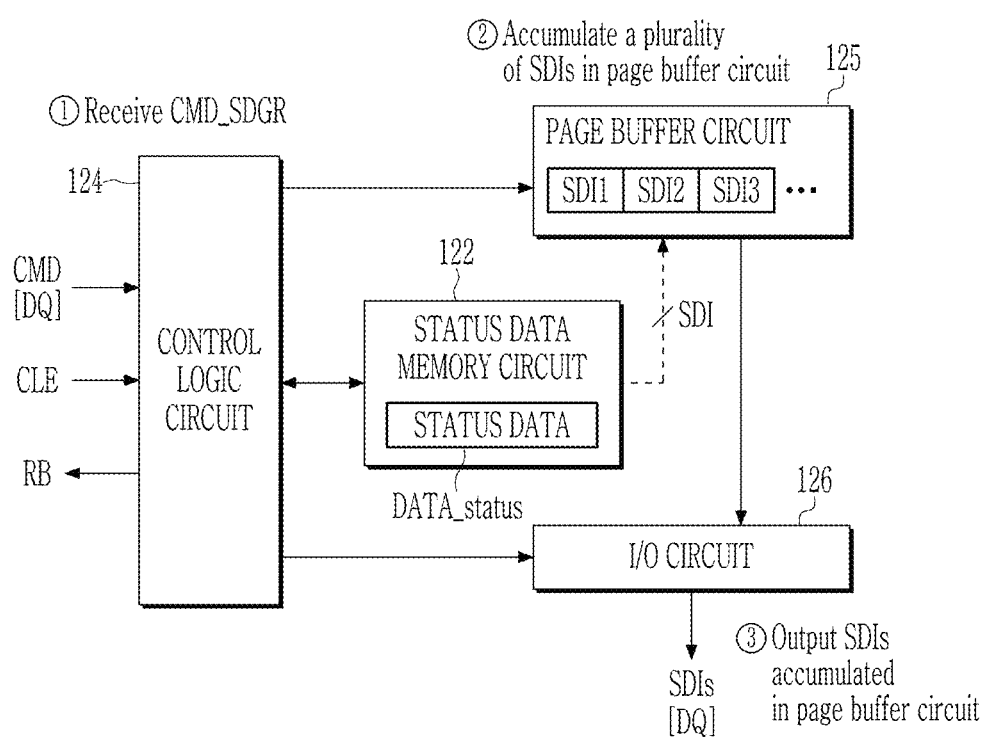
FIG. 6 is a block diagram showing operations of some components of the nonvolatile memory device according to some example embodiments.

FIG. 6 is a block diagram showing operations of some components of the nonvolatile memory device according to some example embodiments of the inventive concepts. Referring to FIGS. 1 to 4 and 6, the control logic circuit 124 may receive a status data group read command CMD_SDGR from the storage controller 110 (①Receive CMD_SDGR). For example, the nonvolatile memory device 120 may decode the status data group read command CMD_SDGR provided through the plurality of data pins DQ based on the command latch enable signal CLE.

The control logic circuit 124 may accumulate the plurality of status data items SDI in the page buffer circuit 125 in response to the status data group read command CMD_SDGR (②Accumulate a plurality of SDIs in page buffer). For example, the control logic circuit 124 may control the status data memory circuit 122 to store the plurality of status data items SDI stored in the status data memory circuit 122 in the page buffer circuit 125.

The control logic circuit 124 may control the input/output circuit 126 to output the plurality of status data items SDI accumulated in the page buffer circuit 125 to the storage controller 110 (③Output SDIs accumulated in page buffer). For example, the input/output circuit 126 may continuously output the plurality of status data items SDI stored in the page buffer circuit 125 through the plurality of data pins DQ in response to control of the control logic circuit 124. A method in which the plurality of status data items SDI are continuously output through the plurality of data pins DQ will be described in more detail with reference to FIG. 8 below.

Figure 7:
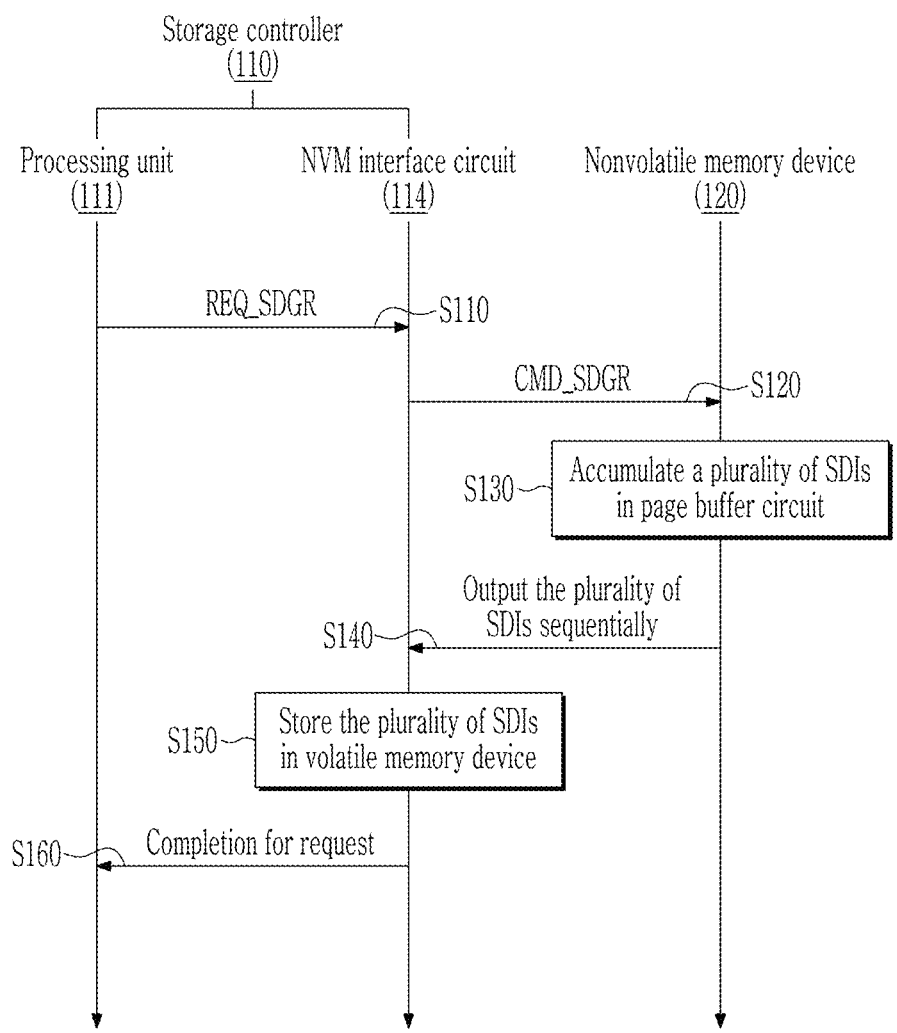
FIG. 7 is a flowchart showing an operation of the storage device according to some example embodiments.

FIG. 7 is a flowchart showing an operation of the storage device according to some example embodiments of the present disclosure. Hereinafter, some example embodiments in which the storage controller 110 continuously reads the plurality of status data items SDI will be described with reference to FIGS. 1 to 4, FIG. 6, and FIG. 7.

First, in operation S110, the processing unit 111 may transmit a status data group read request REQ_SDGR to the nonvolatile memory interface circuit 114. For example, in operation S120, the nonvolatile memory interface circuit 114 may transmit the status data group read command CMD_SDGR to the nonvolatile memory device 120.

In operation S130, the nonvolatile memory device 120 may accumulate the plurality of status data items SDI in the page buffer circuit 125. For example, the status data memory circuit 122 may store the plurality of status data items SDI in the page buffer circuit 125 in response to control of the control logic circuit 124.

In operation S140, the nonvolatile memory device 120 may continuously output the plurality of status data items SDI to the nonvolatile memory interface circuit 114. For example, the input/output circuit 126 may continuously output the plurality of status data items SDI stored in the page buffer circuit 125 to the storage controller 110 through the plurality of data pins DQ.

In operation S150, the nonvolatile memory interface circuit 114 may store the plurality of status data items SDI provided from the nonvolatile memory device 120 in the volatile memory device 112. For example, the processing unit 111 may access the plurality of status data item SDI stored in the volatile memory device 112 directly (e.g., without going through the nonvolatile memory interface circuit 114) through the bus BUS.

In operation S160, the nonvolatile memory interface circuit 114 may transmit completion for the status data group read request REQ_SDGR to the processing unit 111. For example, the processing unit 111 may recognize that the plurality of status data items SDI has been stored in the volatile memory device 112.

In this way, the storage controller 110 according to some example embodiments of the inventive concepts may issue one command (e.g., the status data group read command CMD_SDGR) to continuously read out the plurality of status data items SDI. For example, the processing unit 111 may issue the status data group read request REQ_SDGR once; the nonvolatile memory interface circuit 114 may issue the status data group read command CMD_SDGR once; and the nonvolatile memory interface circuit 114 may continuously output the plurality of status data items SDI to the storage controller 110, so that an operation efficiency of the storage device 100 may be improved.

Figure 8:
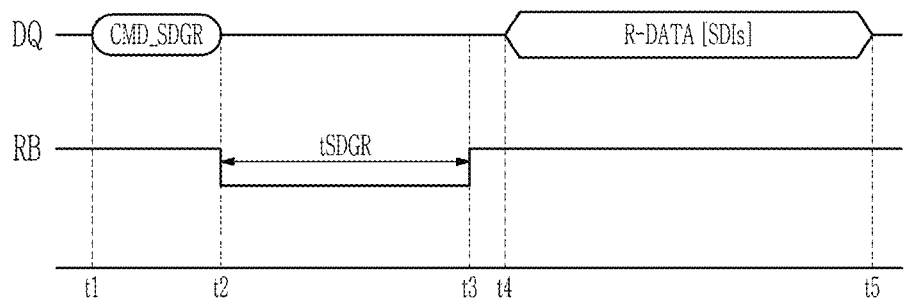
FIG. 8 is a timing diagram showing an operation of the nonvolatile memory device of FIG. 1 in response to a status data group read command according to some example embodiments.

FIG. 8 is a timing diagram showing an operation of the nonvolatile memory device of FIG. 1 in response to the status data group read command according to some example embodiments. The nonvolatile memory device 120 may receive the status data group read command CMD_SDGR from the storage controller 110 at a time period between a first time point t1 and a second time point t2. For example, the nonvolatile memory device 120 may receive the status data group read command CMD_SDGR based on the command latch enable signal CLE that is logic high.

The nonvolatile memory device 120 may perform a read operation on the plurality of status data items SDI in response to the status data group read command CMD_SDGR. For example, the nonvolatile memory device 120 may accumulate the plurality of status data items SDI stored in the status data memory circuit 122 in the page buffer circuit 125 from the second time point t2 (e.g., time point when the status data group read command CMD_SDGR is received) to a third time point t3.

For example, a time interval between the second time point t2 and the third time point t3 may be referred to as a status data group read time tSDGR for the status data memory circuit 122. For example, the status data group read time tSDGR may refer to a time length required for the nonvolatile memory device 120 to store the plurality of status data items SDI stored in the status data memory circuit 122 in the page buffer circuit 125 in response to the status data group read command CMD_SDGR.

The nonvolatile memory device 120 may be in a busy state during the status data group read time tSDGR, and the nonvolatile memory device 120 may be in a ready state during time other than the status data group read time tSDGR. The control logic circuit 124 may notify the storage controller 110 of an operating state (e.g., a busy state or a ready state) of the nonvolatile memory device 120 through the ready/busy signal RB. For example, the control logic circuit 124 may transition the ready/busy signal RB to logic low at the second time point t2, and may transition the ready/busy signal RB to logic high at the third time point t3.

The nonvolatile memory device 120 may continuously output the plurality of status data items SDI stored in the page buffer circuit 125 to the storage controller 110 from a fourth time point t4 after the third time point t3. For example, the nonvolatile memory device 120 may continuously output the plurality of status data items SDI to the storage controller 110 through the plurality of data pins DQ at a time between the fourth time point t4 and a fifth time point t5.

In some example embodiments, the nonvolatile memory device 120 may not receive any command CMD from the storage controller 110 while the plurality of status data items SDI are continuously output through the plurality of data pins DQ. For example, the command latch enable signal CLE may maintain logic low at a time period between the fourth time point t4 and the fifth time point t5. However, the scope of the present disclosure is not limited thereto.

In some example embodiments, a time interval between the third time point t3 and the fourth time point t4 may be "tRR" (time parameter of ready to read enable signal high). However, the scope of the present disclosure is not limited thereto.

In some example embodiments, if the nonvolatile memory device 120 operates in response to the status data group read command CMD_SDGR, the number of times that the ready/busy signal RB toggles after the nonvolatile memory device 120 receives the status data group read command CMD_SDGR and before the nonvolatile memory device 120 outputs the plurality of status data items SDI may be less than the number of the plurality of status data items SDI output by the nonvolatile memory device 120. For example, the number of times that the ready/busy signal RB transitions to logic low between the second time point t2 and the fourth time point t4 may be less than the number of the plurality of status data items SDI output by the nonvolatile memory device 120. For a more detailed example, the number of times that the ready/busy signal RB transitions to logic low from the second time point t2 to the fourth time point t4 may be '1'. That is, according to some example embodiments of the present disclosure, the number of times that the nonvolatile memory device 120 enters the busy state to output the plurality of status data items SDI may be reduced (and/or minimized).

Figure 9:
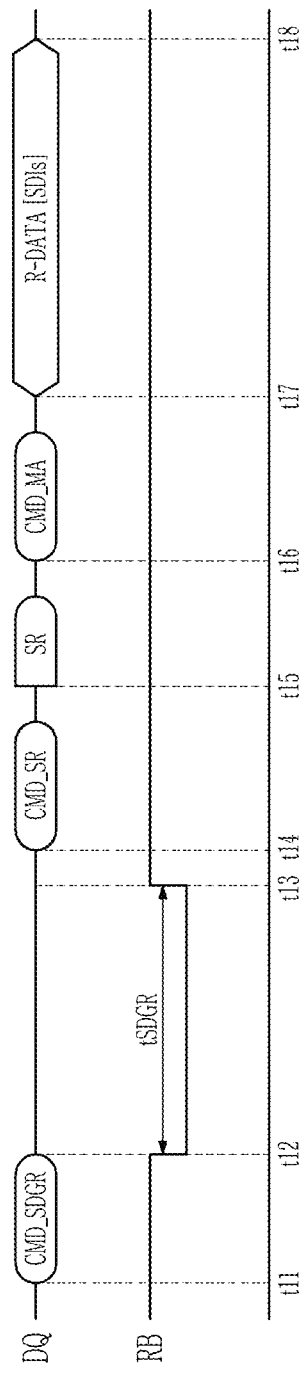
FIG. 9 is a timing diagram showing an operation of the nonvolatile memory device of FIG. 1 operating in response to the status data group read command according to some example embodiments.

FIG. 9 is a timing diagram showing an operation of the nonvolatile memory device of FIG. 1 operating in response to the status data group read command according to some example embodiments. The nonvolatile memory device 120 may receive the status data group read command CMD_SDGR from the storage controller 110 at a time period between an eleventh time point t11 and a twelfth time point t12. The nonvolatile memory device 120 may accumulate the plurality of status data items SDI, stored in the status data memory circuit 122, on the page buffer circuit 125 from the twelfth time point t12 (e.g., time point when the status data group read command CMD_SDGR is received) to a thirteenth time point t13. Because an operation of the nonvolatile memory device 120 at the eleventh to thirteenth time points t11 to t13 is similar to that of the nonvolatile memory device 120 at the first to third time points t1 to t3 described above, a detailed description thereof is omitted.

At a fourteenth time point t14, the nonvolatile memory device 120 may receive a status read command CMD_SR from the storage controller 110. For example, the nonvolatile memory device 120 may receive a "70h" command issued from the nonvolatile memory interface circuit 114. However, the scope of the present disclosure is not limited thereto.

At a fifteenth time point t15 after the fourteenth time point t14, the nonvolatile memory device 120 may output a status read value SR indicating whether an operation for the status data group read command CMD_SDGR is completed in response to the status read command CMD_SR. For example, the nonvolatile memory device 120 may output the status read value SR indicating whether the plurality of status data items SDI are stored in the page buffer circuit 125.

In some example embodiments, the status read value SR may be provided to the storage controller 110 through one of the plurality of data pins DQ.

If the status read command CMD_SR is received during the status data group read time tSDGR (e.g., if the fourteenth time point t14 is earlier than the thirteenth time point t13), the status read value SR may indicate that the plurality of status data items SDI are not completely stored in the page buffer circuit 125 yet. For example, the status read value SR may be '0'. For example, the storage controller 110 may transmit the status read command CMD_SR repeatedly until the status read value SR indicating ready state has been received.

If the status read command CMD_SR is received after the status data group read time tSDGR (e.g., if the fourteenth time point t14 is after the thirteenth time point t13), the status read value SR may indicate that the plurality of status data items SDI are stored in the page buffer circuit 125. For example, the storage controller 110 may read the plurality of status data items SDI by issuing a subsequent command for the status data group read command CMD_SDGR. For example, at a sixteenth time point t16 after the fifteenth time point t15, the nonvolatile memory interface circuit 114 may transmit a memory access command CMD_MA to the nonvolatile memory device 120.

In some example embodiments, the memory access command CMD_MA may be a "00h" command. However, the scope of the present disclosure is not limited thereto.

The nonvolatile memory device 120 may continuously output the plurality of status data items SDI stored in the page buffer circuit 125 to the storage controller 110 from a seventeenth time point t17 after the sixteenth time point t16. For example, the nonvolatile memory device 120 may continuously output the plurality of status data items SDI to the storage controller 110 through the plurality of data pins DQ at a time period between the seventeenth time point t17 and an eighteenth time point t18.

Figure 10:
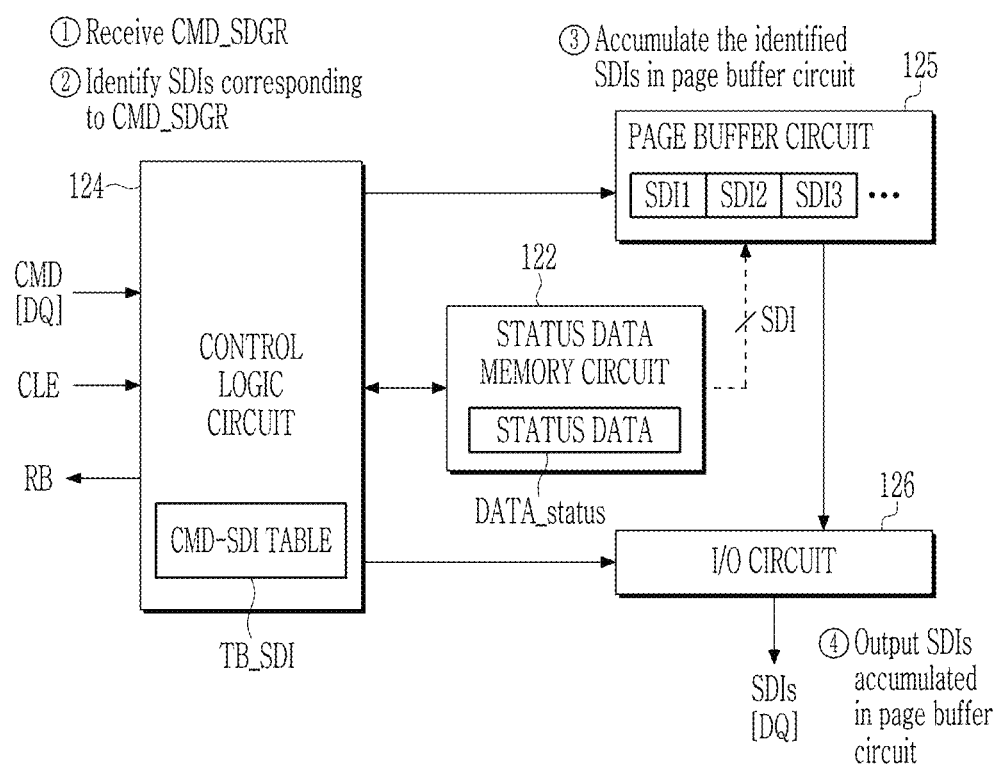
FIG. 10 is a block diagram showing operations of some components of the nonvolatile memory device of FIG. 1 according to some example embodiments.

FIG. 10 is a block diagram showing operations of some components of the nonvolatile memory device of FIG. 1 according to some example embodiments. Referring to FIGS. 1 to 4 and 10, the control logic circuit 124 may receive the status data group read command CMD_SDGR from the storage controller 110 (①Receive CMD_SDGR). For example, the control logic circuit 124 may decode the status data group read command CMD_SDGR provided through the plurality of data pins DQ based on the command latch enable signal CLE.

The control logic circuit 124 may manage a command-status data item table TB_SDI. The command-status data item table TB_SDI may store different status data item lists for each type of the status data group read command CMD_SDGR. A more detailed configuration of the command-status data item table TB_SDI will be described in more detail with reference to FIG. 11 below.

The control logic circuit 124 may identify a type of the status data group read command CMD_SDGR. The control logic circuit 124 may identify the plurality of status data items SDI corresponding to the type of the status data group read command CMD_SDGR based on the command-status data item table TB_SDI (②Identify SDIs corresponding to CMD_SDGR).

The control logic circuit 124 may accumulate the identified plurality of status data items SDI in the page buffer circuit 125 (③Accumulate the identified SDIs in page buffer). For example, the control logic circuit 124 may control the status data memory circuit 122 to store the identified status data items SDI among the plurality of status data items SDI stored in the status data memory circuit 122 in the page buffer circuit 125.

The control logic circuit 124 may control the input/output circuit 126 to output the plurality of status data items SDI stored in the page buffer circuit 125 to the storage controller 110 (④Output SDIs accumulated in page buffer). For example, the input/output circuit 126 may continuously output the plurality of status data items SDI stored in the page buffer circuit 125 through the plurality of data pins DQ in response to a control of the control logic circuit 124. Because a method in which the input/output circuit 126 continuously outputs the plurality of status data items SDI through the plurality of data pins DQ is similar to that of the embodiment described above, a detailed description thereof is omitted.

FIG. 11 shows the command-status data item table of FIG. 10. Referring to FIGS. 1 to 4 and 10 to 11, the command-status data item table TB_SDI may store different status data item lists LIST for each type of the status data group read command CMD_SDGR. For example, the command-status data item table TB_SDI may store a first status data item list LIST1 corresponding to a first status data group read command type CMD_SDGRa, a second status data item list LIST2 corresponding to a second status data group read command type CMD_SDGRb, and a third status data item list LIST3 corresponding to a third status data group read command type CMD_SDGRc.

The status data item lists LIST included in the command-status data item table TB_SDI may correspond to different combinations for the first to n-th status data items SDI1-SDIn. For example, the first status data item list LIST1 may include all of the first to n-th status data items SDI1-SDIn. On the other hand, the second status data item list LIST2 may include odd-numbered status data items among the first to n-th status data items SDI1-SDIn, and the third status data item list LIST3 may include even-numbered status data items among the first to n-th status data items SDI1-SDIn. However, the scope of the present disclosure is not limited to a specific combination of the first to n-th status data items SDI1-SDIn for each status data item list LIST.

In some example embodiments, the storage controller 110 may issue different types of status data group read commands CMD_SDGR depending on specific situation. For example, if an erase failure of the nonvolatile memory device 120 occurs, the storage controller 110 may issue the data group read command CMD_SDGR of the first status data group read command type CMD_SDGRa. On the other hand, if a program failure of the nonvolatile memory device 120 occurs, the storage controller 110 may issue the status data group read command CMD_SDGR of the second status data group read command type CMD_SDGRb. However, the scope of the present disclosure will not be limited to a type of a specific situation in which the storage controller 110 issues the status data group read command CMD_SDGR.

In some example embodiments, the control logic circuit 124 may identify a type of the status data group read command CMD_SDGR based on command set or command sequence. For example, the different types of the status data group read commands CMD_SDGR may be transmitted based on different command sets or different command sequences.

Figure 12:
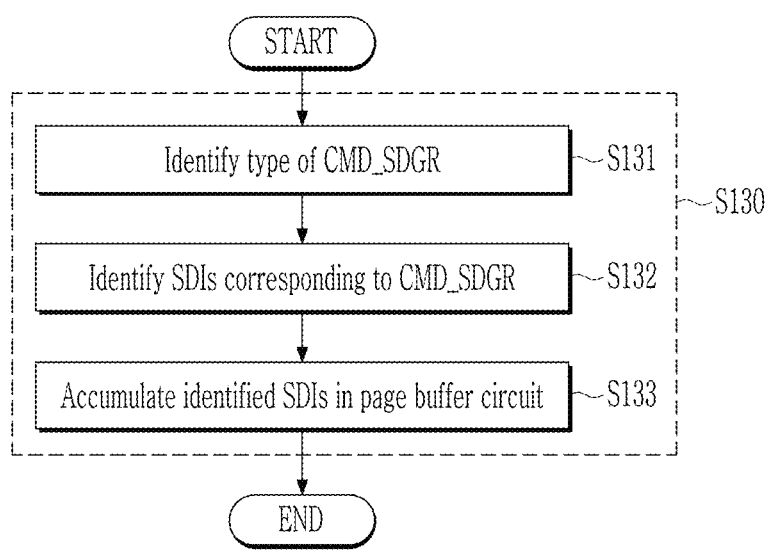
FIG. 12 is a flowchart showing an operation method of the nonvolatile memory device according to the embodiment of FIG. 10.

FIG. 12 is a flowchart showing an operation method of the nonvolatile memory device according to the embodiment of FIG. 10. Referring to FIGS. 1 to 4 and FIGS. 10 to 12, the storage device 100 described above with reference to FIG. 10 and FIG. 11 may also operate in a manner similar to that of the embodiment described above with reference to FIG. 7. For example, the storage controller 110 may continuously read the plurality of status data items SDI from the nonvolatile memory device 120 in a manner similar to that of the embodiment described with reference to FIG. 7.

If the nonvolatile memory device 120 is implemented in the same manner as that of the embodiment described with reference to FIG. 10 and FIG. 11, the above-described operation S130 may include the following operations S131 to S133.

In operation S131, the nonvolatile memory device 120 may identify a type of the status data group read command CMD_SDGR. For example, the control logic circuit 124 may identify the type of the status data group read command CMD_SDGR based on command set or command sequence of the status data group read command CMD_SDGR.

In operation S132, the nonvolatile memory device 120 may identify the plurality of status data items SDI corresponding to the status data group read command CMD_SDGR. For example, the control logic circuit 124 may identify the status data item list LIST that corresponds to the identified type of the status data group read command CMD_SDGR based on the command-status data item table TB_SDI.

In operation S133, the nonvolatile memory device 120 may accumulate the identified status data items SDI in the page buffer circuit 125. For example, the control logic circuit 124 may control the status data memory circuit 122 to accumulate status data items included in the data item list LIST identified through the operation S132 among the plurality of status data items SDI stored in the status data memory circuit 122 in the page buffer circuit 125.

Figure 13:
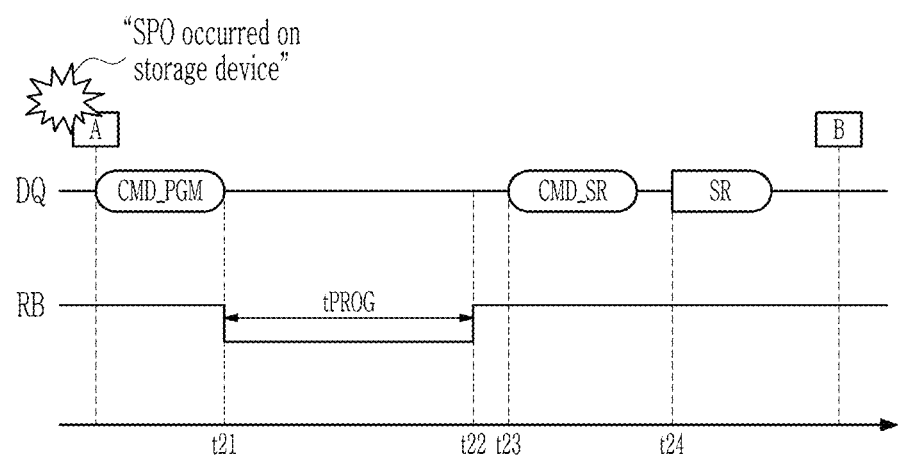
FIG. 13 is a timing diagram showing an operation of the storage device when SPO occurs.
Figure 13:
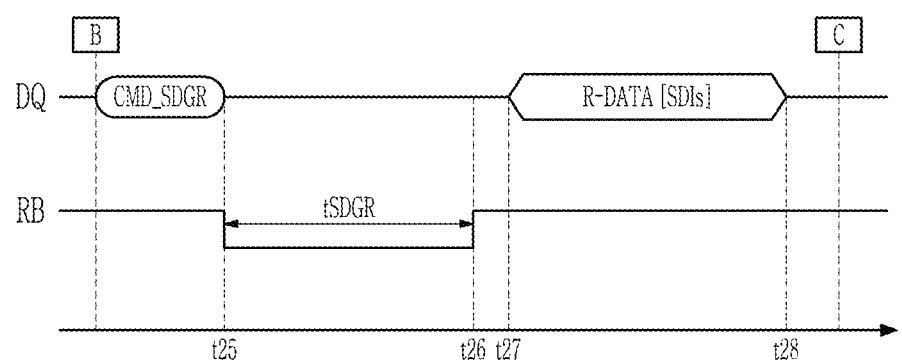
Figure 13:
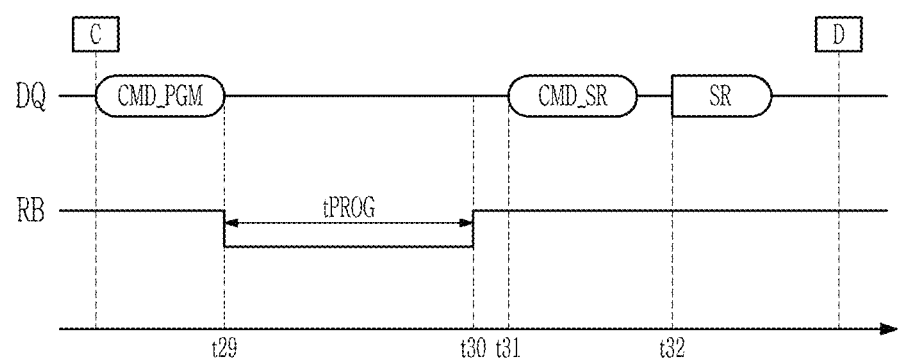

FIG. 13 is a timing diagram showing an operation of the storage device when SPO occurs. Hereinafter, for a more concise description, it is assumed that the sudden power off (SPO) occurs on the storage device 100 at a time point A. That is, hereinafter, it is assumed that the storage device 100 operates based on electric power of an auxiliary power capacitor after the SPO occurs.

Referring to FIGS. 1 to 13, the storage controller 110 may provide a program command CMD_PGM to the nonvolatile memory device 120 if the SPO occurs on the storage device 100. For example, the storage controller 110 may issue the program command CMD_PGM to store data stored in the volatile memory device 112 to the nonvolatile memory device 120.

The nonvolatile memory device 120 may perform a program operation for data stored in the volatile memory device 112 in response to the program command CMD_PGM. For example, from a 21-st time point t21 to a 22nd time point t22, the nonvolatile memory device 120 may perform a program operation on the memory cell array 121 when the program command CMD_PGM is received. A time interval between the 21-st time point t21 and the 22-nd time point t22 may be referred to as a program time tPROG.

At a 23rd time point t23 after the 22-nd time point t22, the storage controller 110 may transmit the status read command CMD_SR to the nonvolatile memory device 120. For example, at a 24-th time point t24 after the 23-rd time point t23, the nonvolatile memory device 120 may output the status read value SR indicating whether the program operation is successful in response to the status read command CMD_SR. For example, the nonvolatile memory device 120 may output the status read value SR through a 0-th data pin (e.g., a DQ0 pin) among the plurality of data pins DQ. For a more detailed example, if the program operation is successful, the status read value SR may indicate "0". On the other hand, if the program operation fails, the status read value SR may indicate "1". However, the scope of the present disclosure is not limited thereto.

If the status read value SR indicates that the program operation fails, the storage controller 110 may require the plurality of status data items SDI. For example, the storage controller 110 may require the plurality of status data items SDI to analyze or infer a cause of a failure of the program operation. However, after the SPO situation occurs, the storage controller 110 is required to obtain the plurality of status data items SDI within a shortest as possible time period (e.g., while electric power is temporarily maintained by the auxiliary power capacitor). For example, at a time point B, the storage controller 110 may provide the status data group read command CMD_SDGR to the nonvolatile memory device 120. For example, similar to the above description with reference to FIG. 8, the nonvolatile memory device 120 may accumulate the plurality of status data items SDI in the page buffer circuit 125 at a time between a 25th time point t25 and a 26-th time point t26. Thereafter, the nonvolatile memory device 120 may continuously output the plurality of status data items SDI accumulated in the page buffer circuit 125 at a time between a 27-th time point t27 and a 28-th time point t28.

For example, according to some example embodiments of the inventive concepts, a time required for the storage controller 110 to collect the plurality of status data items SDI in the SPO situation may be reduced (and/or minimized). Therefore, according to some example embodiments of the inventive concepts, reliability of the storage device 100 may increase. According to some example embodiments of the inventive concepts, even if the auxiliary power capacitor with smaller capacity is used, the reliability of the storage device 100 in the SPO situation may be secured. Thus, production cost of the storage device 100 may be reduced.

The storage controller 110 may continuously receive the plurality of status data items SDI at the time between the 27-th time point t27 and the 28-th time point t28. For example, the storage controller 110 may analyze a cause of a failure of the program operation at the time period between the 21-st time point t21 and the 22-nd time point t22 based on the plurality of status data items SDI, and may retry a program operation for the nonvolatile memory device 120 (e.g., try to program for another address of the memory cell array 121) based on the analysis result. For example, the storage controller 110 may reissue the program command CMD_PGM at a time point C after the 28-th time point t28.

The nonvolatile memory device 120 may perform a program operation on data stored in the volatile memory device 112 in response to the program command CMD_PGM. For example, from a 29-th time point t29 (e.g., when the program command CMD_PGM is received) to a 30th time point t30, the nonvolatile memory device 120 may perform a program operation on the memory cell array 121.

At a 31-st time point t31 after the 30-th time point t30, the storage controller 110 may transmit the status read command CMD_SR to the nonvolatile memory device 120. For example, at a 32-nd time point t32 after the 31-st time point t31, the nonvolatile memory device 120 may output the status read value SR indicating a success of the program operation in response to the status read command CMD_SR.

In some example embodiments, at a time point D after the program operation is completed, electric power of the auxiliary power capacitor may be completely exhausted.

That is, according to some example embodiments of the inventive concepts, a time length required for the storage controller 110 to gather the plurality of state data items SDI in the SPO situation (e.g., a time length between the time point B and the time point C) may be reduced (and/or minimized). Therefore, at a time between the time point A when the SPO situation occurs and the time point D when the storage device 100 is completely powered off, a time length margin for the storage controller 110 to program data stored in the volatile memory device 112 in the nonvolatile memory device 120 may be increased (and/or maximized). Therefore, according to some example embodiments of the inventive concepts, reliability of the storage device 100 at the SPO situation may be improved.

Figure 14:
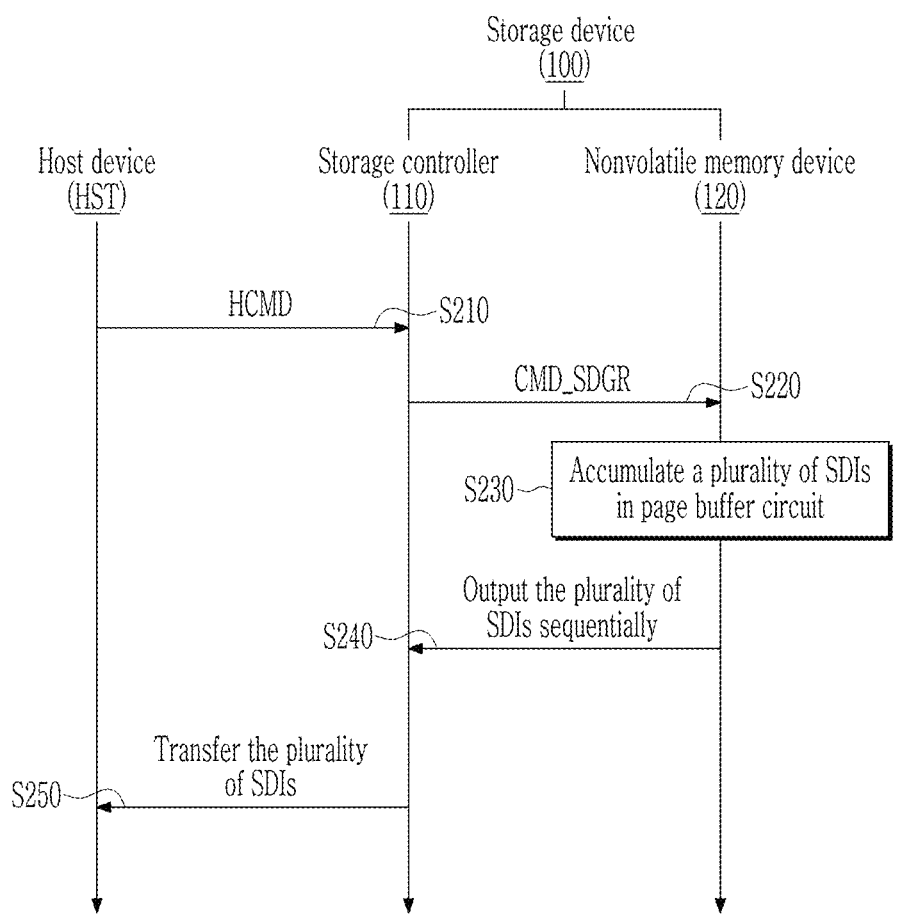
FIG. 14 is a flowchart showing the storage system operating in response to control of a host device.

FIG. 14 is a flowchart showing the storage system operating in response to control of the host device. Hereinafter, some example embodiments in which the host device HST controls the storage device 100 to read the plurality of status data items SDI will be described with reference to FIGS. 1 to 12 and 14.

First, in operation S210, the host device HST may transmit a host command HCMD to the storage controller 110. For example, the host device HST may transmit the host command HCMD to the host interface circuit 113.

In some example embodiments, the host command HCMD may be a telemetry command. For example, the host device HST may collect the status data item SDI stored in the nonvolatile memory device 120 to issue the host command HCMD in order to predict a lifespan of the storage device 100 or an occurrence of a defect in the storage device 100. However, the scope of the present disclosure is not limited thereto.

In operation S220, the storage controller 110 may transmit the status data group read command CMD_SDGR to the nonvolatile memory device 120. For example, the processing unit 111 may transmit the status data group read request REQ_SDGR to the nonvolatile memory interface circuit 114, and the nonvolatile memory interface circuit 114 may transmit the status data group read command CMD_SDGR to the nonvolatile memory device 120. Because the operation of the operation S220 is similar to the operation of operations S110 and S120 described above, a detailed description thereof is omitted.

In operation S230, the nonvolatile memory device 120 may accumulate the plurality of status data items SDI in the page buffer circuit 125. In operation S240, the nonvolatile memory device 120 may continuously output the plurality of status data items SDI to the storage controller 110. Because the operation of the storage device 100 in the operations S230 and S240 is similar to the operation of the storage device 100 in the operations S130 and S140 described above, a detailed description thereof is omitted.

In operation S250, the storage controller 110 may transmit the plurality of status data items SDI to the host device HST. For example, the storage controller 110 may transfer the plurality of status data item SDI received in the operation S240 to the host device HST.

That is, according to some example embodiments of the inventive concepts, the storage controller 110 may issue the status data group read command CMD_SDGR in response to the host command CMD. For example, an operation of the storage device 100 while the host device HST collects the plurality of status data items SDI may be further simplified, and a time required for the host device HST to collect the plurality of status data items SDI may be reduced (and/or minimized).

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, an application-specific integrated circuit (ASIC), etc.

Some example embodiments for implementing the inventive concepts have been described. The inventive concepts may include not only the above-described example embodiments but also other embodiments that may be simply changed in design or may be easily modified. Additionally, the inventive concepts may also include technologies that may be easily modified and implemented using the example embodiments. Therefore, the scope of the inventive concepts should not be limited to the above-described example embodiments, but should be defined by the claims described below as well as the claims and equivalents of the present disclosure.

What is claimed is:

1. A nonvolatile memory device, comprising:
a memory cell array including a plurality of nonvolatile memory cells;
a page buffer circuit connected to the memory cell array;
a status data memory circuit configured to store a first plurality of status data items;
a control logic circuit configured to control the status data memory circuit to accumulate the first plurality of status data items in the page buffer circuit, in response to a first status data group read command provided from an external device; and
an input/output circuit configured to output the first plurality of status data items accumulated in the page buffer circuit to the external device.

2. The nonvolatile memory device of claim 1, wherein the status data memory circuit is a volatile memory circuit outside the memory cell array.

3. The nonvolatile memory device of claim 1, wherein the input/output circuit is configured to continuously output the first plurality of status data items to the external device.

4. The nonvolatile memory device of claim 1, wherein the control logic circuit is configured to
store a plurality of status data item lists corresponding to different status data group read command types, and
determine one or more status data items to be accumulated in the page buffer circuit, based on the plurality of status data item lists.

5. The nonvolatile memory device of claim 4, wherein among the plurality of status data item lists
a first status data item list corresponding to a first status data group read command type of the first status data group read command includes the first plurality of status data items, and
a second status data item list corresponding to a second status data group read command type for a second status data group read command includes a second plurality of status data items.

6. The nonvolatile memory device of claim 5, wherein the control logic circuit is configured to
identify the second status data group read command type of the second status data group read command provided from the external device, and
control the status data memory circuit to accumulate the second plurality of status data items in the page buffer circuit, in response to the identified second status data group read command type, and
the input/output circuit is configured to
output the second plurality of status data items accumulated in the page buffer circuit to the external device.

7. The nonvolatile memory device of claim 1, wherein between a first time point when the first status data group read command is received and a second time point when the first plurality of status data items start to be output to the external device, a first number of times that a ready-busy signal indicating an operating status of the nonvolatile memory device to the external device transitions to logic low is less than a second number of the first plurality of status data items.

8. The nonvolatile memory device of claim 7, wherein the first number is one.

9. The nonvolatile memory device of claim 1, wherein the first plurality of status data items include a plurality of status data values corresponding to different status data attributes.

10. A storage device comprising:
a storage controller including
a processing circuit configured to issue a status data group read request, and
a nonvolatile memory interface circuit configured to issue a status data group read command in response to the status data group read request; and a nonvolatile memory device configured to continuously provide a plurality of status data items to the nonvolatile memory interface circuit, in response to the status data group read command.

11. The storage device of claim 10, wherein
the storage controller further includes a volatile memory device, and
the nonvolatile memory interface circuit is configured to store the plurality of status data items in the volatile memory device.

12. The storage device of claim 11, wherein the nonvolatile memory interface circuit is configured to transmit a completion of the status data group read request to the processing circuit, after the nonvolatile memory interface circuit stores the plurality of status data items in the volatile memory device.

13. The storage device of claim 11, wherein the processing circuit is configured to issue the status data group read request at a second time point after a first time point when a sudden power off (SPO) occurs on the storage device.

14. The storage device of claim 13, wherein
the nonvolatile memory interface circuit is configured to provide a program command for temporary data stored in the volatile memory device to the nonvolatile memory device at a third time point between the first time point and the second time point, and
the nonvolatile memory device is configured to transmit a status read value notifying program failure for the temporary data at a fourth time point between the second time point and the third time point.

15. The storage device of claim 10, wherein the processing circuit is configured to issue the status data group read request in response to a telemetry command provided from an external device.

16. The storage device of claim 15, wherein the storage controller further includes a host interface circuit configured to transmit the plurality of status data items to the external device.

17. The storage device of claim 10, wherein the nonvolatile memory device comprises:
a page buffer circuit;
a status data memory circuit configured to store the plurality of status data items;
a control logic circuit configured to control the status data memory circuit to accumulate the plurality of status data items in the page buffer circuit, in response to the status data group read command; and
an input/output circuit configured to continuously output the plurality of status data items accumulated in the page buffer circuit to the nonvolatile memory interface circuit.

18. The storage device of claim 10, wherein
the nonvolatile memory device is configured to receive the status data group read command based on a command latch enable signal, and
the nonvolatile memory interface circuit is configured to output the command latch enable signal that is logic low during a first time period when the plurality of status data items are sequentially provided from the nonvolatile memory device.

19. An operation method of a nonvolatile memory device including a page buffer circuit connected to a volatile memory circuit and a nonvolatile memory cell array, the operation method comprising:
receiving a status data group read command from an external device;
accumulating a first plurality of status data items stored in the volatile memory circuit to the page buffer circuit based on the status data group read command; and
outputting the first plurality of status data items accumulated in the page buffer circuit to the external device.

20. The operation method of claim 19, wherein the accumulating comprises:
identifying the first plurality of status data items corresponding to the status data group read command from among a plurality of status data items stored in the volatile memory circuit; and
accumulating the identified first plurality of status data items in the page buffer circuit.

* * * * *